United States Patent [19]

Cunha

[11] 3,844,579

[45] Oct. 29, 1974

[54] LEAF SPRING TRAILING ARM SUSPENSION

[75] Inventor: Joseph J. Cunha, Castro Valley, Calif.

[73] Assignee: Cunha Products, Inc., Haywood, Calif.

[22] Filed: Jan. 31, 1973

[21] Appl. No.: 328,455

[52] U.S. Cl............... 280/124 R, 267/52, 267/43
[51] Int. Cl............................................. B60g 11/34
[58] Field of Search............ 280/124 R; 267/31, 32, 267/36, 38, 40, 54, 41, 44, 45, 42, 43, 47

[56] References Cited
UNITED STATES PATENTS

| | | | |
|---|---|---|---|
| 1,549,181 | 8/1925 | Chokas | 267/43 |
| 1,890,853 | 12/1932 | Howard | 267/47 |
| 3,361,445 | 1/1968 | Harbers | 267/52 |
| 3,528,680 | 9/1970 | Nelson | 280/124 R |

Primary Examiner—Philip Goodman
Attorney, Agent, or Firm—Naylor, Neal & Uilkema

[57] ABSTRACT

A multiple-leaf trailing arm having all leaves fixedly secured at their forward end to a bracket pivotally mounted on a hanger secured to a vehicle frame, and fixedly secured at their rearward end to a vehicle axle. The upper leaves of the arm extend from the bracket to the midpoint of the axle and the lowermost leaf of the arm extends from the bracket to the lower edge of the axle for increased resistance to axle torque.

The attachment of the leaves to the bracket is adjustable for adjustment of the spacing of the axle from the hangers and alignment of the axle relative to the vehicle frame.

6 Claims, 6 Drawing Figures

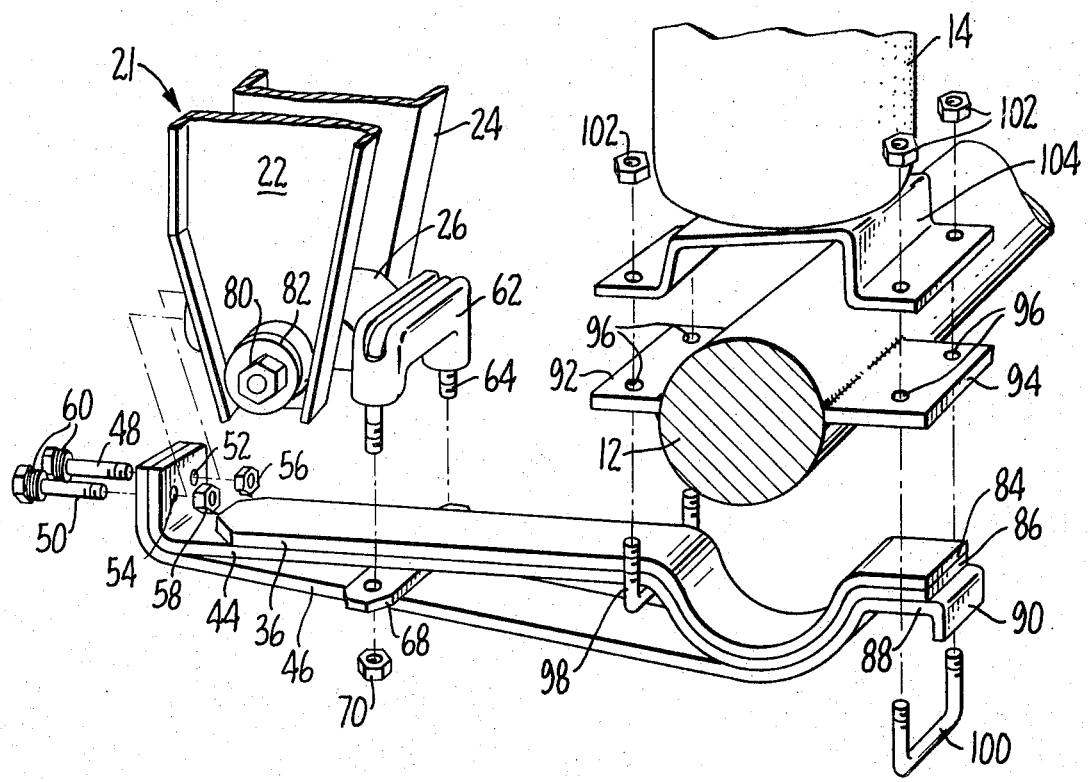
FIG. 3.
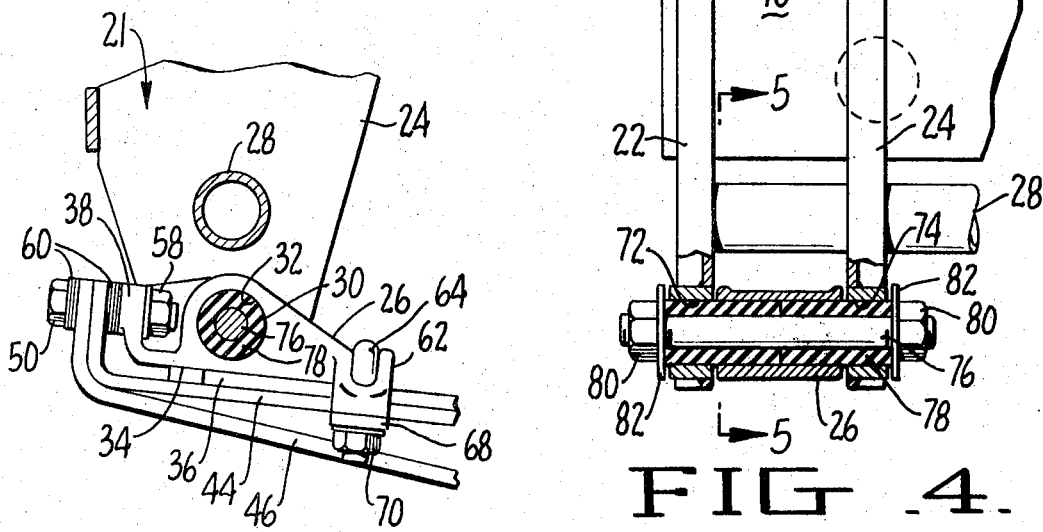
FIG. 5.
FIG. 4.

3,844,579

LEAF SPRING TRAILING ARM SUSPENSION

BACKGROUND OF THE INVENTION

This invention relates to axle suspension systems for heavy duty vehicles such as semi-trailer tractors and semi-trailer dollies and, more particularly, to the construction of trailing arm assemblies which are employed to counteract axle torque and to transmit driving and braking forces to the vehicle frame.

It is well known in the prior art to employ leaf springs for this purpose. However, when large torque forces are developed by the axles, large bending moments result in the trailing arm which are sometimes greater than the capacity of trailing arm provided. To resist such large bending moments, the capacity of the trailing arm must be increased. However, heavier construction of the trailing arm results in greater weight, expense, complexity, and rigidity.

It has been found that if individual leaves in the trailing arms are significantly divergent, axle torque will then be resisted by tension and compression forces in the leaves as well as by bending moments. Accordingly, such construction requires fewer leaves in a trailing arm assembly to resist axle torques.

However, the divergence of leaves in the leaf spring trailing arm creates other problems with respect to simple attachment of the trailing arm to the vehicle frame and axle. In the past, the divergent ends of the trailing arm leaves have been attached to the vehicle frame, which increases the complexity of the attachment brackets required. Also, some means of adjusting the axle must be provided to assure that it is properly aligned with the longitudinal axis of the vehicle. When the divergent ends of the trailing arm leaves are attached to the vehicle frame, this adjustment means must be provided in the attachment of the axle to the trailing arm. However, such prior art adjustment means have been characterized by looseness and play which have allowed misalignment of the axle with respect to the vehicle axis.

BRIEF DESCRIPTION OF THE INVENTION

Accordingly, it is an object of the present invention to provide a leaf spring trailing arm suspension assembly which is of relatively simple, light, and resilient construction, but is capable of resisting large axle torques.

Another object of the present invention is to provide a leaf spring trailing arm assembly with simple attachment means for attaching one end thereof to a vehicle frame, and the other end thereof to a vehicle axle.

Still another object of this invention is to provide such an attachment means which allows simple but secure adjustment of the axle with respect to the vehicle frame.

These and other objects and advantages are achieved by the construction of the present invention which employs a multiple-leaf trailing arm in which the leaves are connected together at their forward end to a bracket pivotally mounted on a hanger depending from the vehicle frame, and which diverge rearwardly toward the vehicle axle. The lowermost leaf extends from the forward end of the arm to the lower edge of the axle, while the upper leaves extend from the forward end of the arm to a portion of the axle spaced above its lower edge. The leaves are then clamped to the axle by means of U-bolts extending over the leaves and through a pressure plate disposed over the axle or secured thereto.

The bracket is adapted for clamping to the forward end of the trailing arm by suitable bolt means.

BRIEF DESCRIPTION OF THE DRAWINGS

FIG. 3 is an exploded perspective view of the leaf spring trailing arm suspension of the present invention;

FIG. 4 is a sectional view of the front mounting bracket of the present invention;

FIG. 5 is a sectional view of the front mounting bracket of the present invention taken along the plane indicated by arrows 5—5 in FIG. 4; and, FIG. 6 is a schematic force diagram showing how torque forces are transmitted through the leaf spring trailing arm of the present invention.

DESCRIPTION OF THE ILLUSTRATED EMBODIMENT

Figure 1:
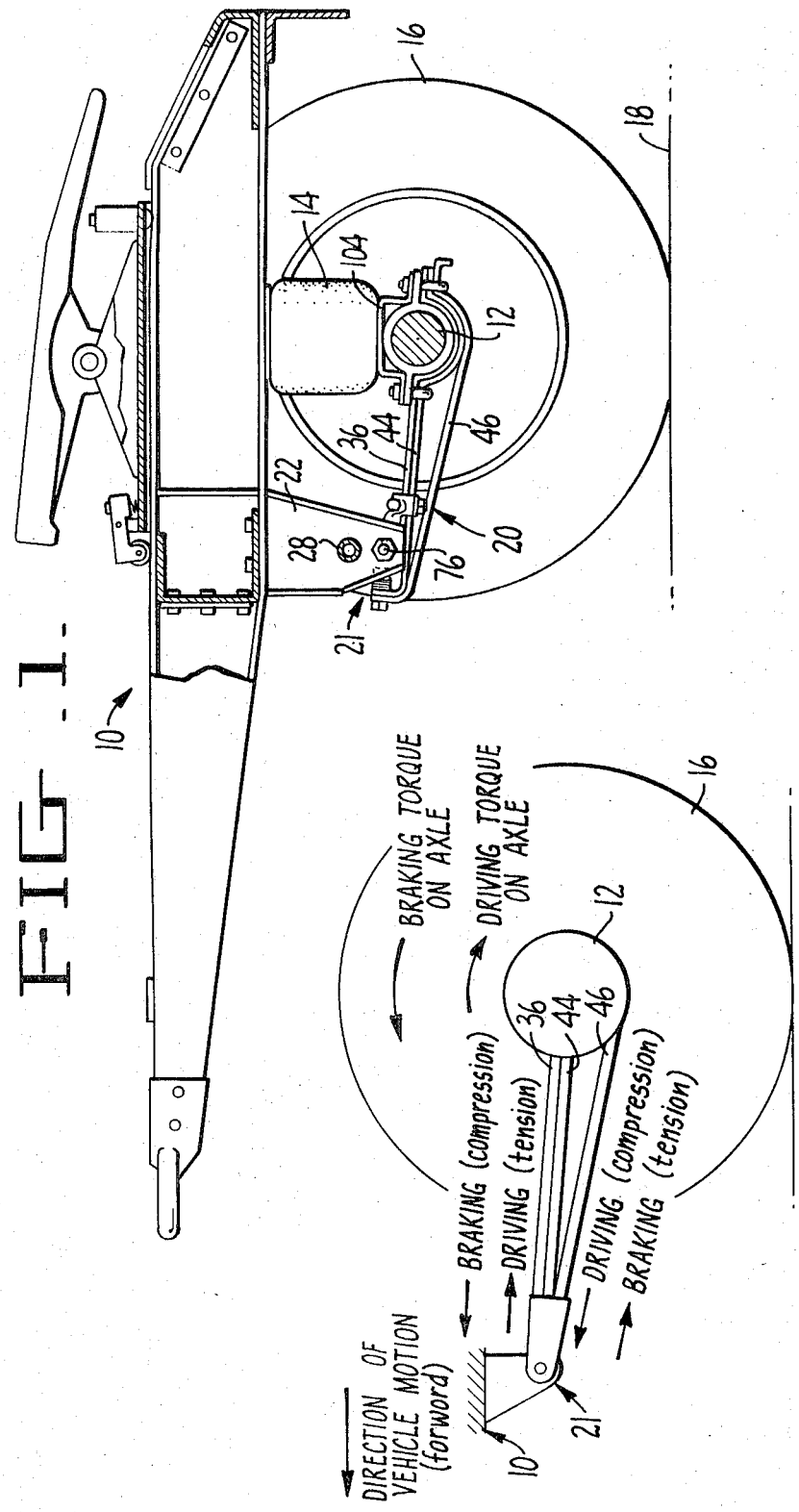
FIG. 1 is a side elevational view of a rear portion of a dolly frame and axle embodying the present invention.

Referring to FIG. 1, a dolly embodying the present invention includes a frame shown generally at 10, an axle 12 spaced from the frame by a resilient member 14 and wheels 16 mounted on the axle in engagement with the ground 18. The resilient members may take any conventional form such as springs, air bags or elastomeric balls. The members illustrated are solid elastomeric balls, such as the type marketed by Lord Manufacturing Company of Erie, Pennsylvania, under the mark "LASTOSPHERE."

In the dolly embodiment illustrated, wherein the wheels 16 are free wheeling, braking of the wheels develops a torque, tending to rotate the axle. If the axle were driven, as would be the case if the suspension were used to support the drive wheels of a tractor, both linear forces and torque forces would be applied to the axle. These forces on axle housing 12 are resisted by the trailing arm suspension system shown generally at 20.

Referring now to FIG. 3, the trailing arm suspension system includes a hanger assembly 21 comprising spaced parallel depending hanger plates 22 and 24 fixedly secured to the dolly frame, and a bracket 26 pivotally mounted between the plates. A spacer 28 is fixed between the plates to add lateral rigidity to the hanger assembly, and to accurately define the spacing of the ends of the plates.

The bracket 26, as may be seen from FIG. 5, includes a central portion 30 having a bore 32 therethrough and a flat lower surface 34 to which a leaf spring 36 may be clamped. The forward end of bracket 26 is provided with an upstanding flange 38 which has bores 40 and 42 provided therein for mounting the upstanding forward ends of leaf springs 44 and 46 thereto by means of bolts 48 and 50. The bolts extend through bores 52 and 54 provided in the leaf springs 44 and 46 and through the bores 40 and 42 in the flange 38, and are secured therein by nuts 56 and 58, respectively. A plurality of washers or shims 60 are provided on bolts 48 and 50 on both sides of the leaf springs 44 and 46 to provide for longitudinal adjustment of the trailing arm suspension system and the axle housing 12 with respect to the dolly frame for alignment of the axle housing with respect to the frame.

The rearward end of bracket 26 is provided with a saddle 62 for receiving a U-bolt 64 which is effective, in combination with a pressure plate 68 and nuts 70, to clamp leaf springs 36 and 44 to the bracket 26 rearward of the hanger plates.

The distal ends of the hanger plates 22 and 24, as may be seen from FIG. 4, are provided with bores 72 and 74, respectively. The bracket 26 is mounted between the plates 22 and 24 by means of a rubber bushed bolt 76 disposed within the bores 72 and 74 of the hanger plates and the bore 32 in bracket 26. The resilient bushing on the bolt is in two parts and designated by the numeral 78. Nuts 80 and cooperating washers 82 received on either end of the bolt hold the bolt in place and clamp the bushing 78 in compression.

Referring again to FIG. 3, leaf springs 36 and 44 extend from bracket 26 towards a midpoint of axle housing 12, and then around the lower circumference thereof and terminate in rearwardly projecting ends 84 and 86, respectively. Leaf spring 46 extends from bracket 26 to the lowermost edge of axle housing 12 where it meets leaf spring 44 and then accompanies it around a portion of axle housing 12 and terminates in a rearwardly extending end 88, having a depending lip 90 provided thereon.

The axle 12 has diametrically opposed outstanding flanges 92 and 94 welded thereto, which flanges have holes 96 provided therein for receiving U-bolts 98 and 100. The U-bolts are provided to clamp the leaf spring bundle comprised of the springs 36, 44 and 46 to the underside of the axle and clamp a saddle 104 to the upper side of the axle. Nuts 102 are threadably received on the U-bolts in clamping engagement with the upper surface of the plate 104.

The saddle plate 104 is arched upwardly to accommodate the axle 12 and the resilient member 14 is secured to the central upper surface of the plate. The upper end of the resilient member is secured to a plate 106 secured to the underside of the frame in vertical alignment with the axle. While not illustrated, it is anticipated that the saddle plate 104 might be welded to the upper side of the axle 12. In this case, the flanges 92 and 24 might be omitted and a selectively releasable fastening would be provided between the resilient member 14 and the saddle plate.

Figure 2:
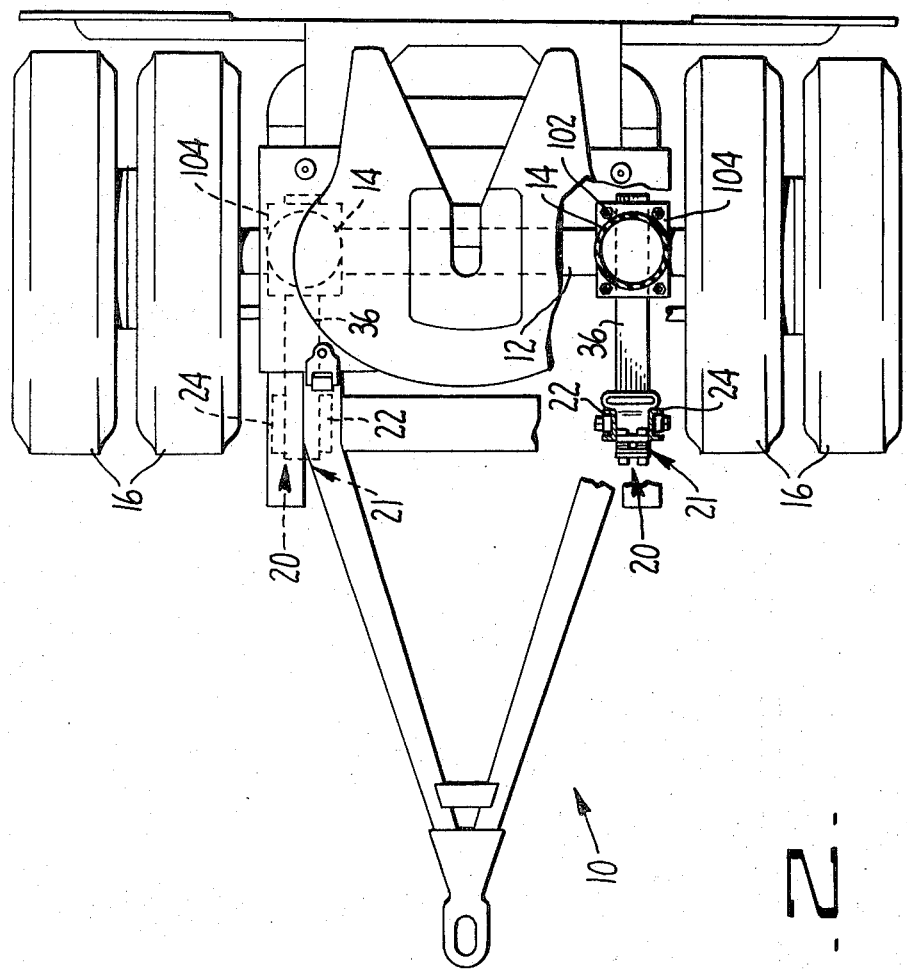
FIG. 2 is a top plan view of the dolly frame shown in FIG. 1.

While only one side of the trailing arm suspension system has been described in detail, it should be understood that the arm arrangement is duplicated at both sides of the dolly frame, as may be seen from FIG. 2. The hanger assemblies for the respective trailing arms provide for alignment of the axle with the dolly frame.

In operation, linear forces on axle 12 will be transmitted to the hangers through the composite of the leaf springs in relative straight line fashion. Torque forces on the axle, however, are transmitted to the hanger as tension and compression forces through the lower leaves of the spring and the upper leaf of the spring. This transmission of forces may be seen from the force diamgram of FIG. 6 wherein a driven axle is shown positioned by the trailing arm of the present invention and torque forces are shown, respectively, for the condition wherein the axle is driving a vehicle in a forward direction and the condition wherein the axle is braking forward motion of a vehicle. Specifically, on braking, torque forces apply compression to the upper leaves (36, 44) and tension to the lower leaf (46). Conversely, on driving, torque forces apply tension to the upper leaves (36, 44) and compression to the lower leaf (46). Thus, it can be seen the torsion forces are effectively resisted, while the flexibility of a resilient arm is achieved.

While a preferred embodiment of the invention has been illustrated and described, it should be understood that the invention is not intended to be limited to this embodiment, but rather is defined by the accompanying claims.

I claim:

1. A suspension assembly for positioning a wheel supported axle below the frame of a vehicle, said assembly comprising: a pair of transversely spaced hangers depending from a frame; a bracket pivotally mounted on each of the hangers; a leaf spring bundle secured to each bracket and extending therefrom to the axle, each of said bundles comprising upper and lower leaves which diverge relative to one another from the hanger to which it is connected; means securing the upper and lower leaves of each bundle to the axle in vertically spaced relationship so that the upper leaves extend to a connection at a mid-portion of the axle and the lower leaves extend to a connection at a lower portion of the axle spaced beneath said mid-portion; and, resilient means disposed to suspend the frame on the axle.

2. A trailing arm suspension assembly for positioning a wheel supported axle for support of the frame of a vehicle, said assembly comprising: a pair of transversely spaced hangers depending from the frame; a bracket pivotally mounted on each of the hangers; a spring bundle fixedly secured to each bracket and extending rearwardly therefrom, said bundles each comprising first and second leaves extending from the bracket to a point proximate the forward extremity of the axle, said first and second leaves wrapping around the axle so as to extend from a point proximate the forward extremity of the axle to a point proximate the rearward extremity of the axle, and a third leaf extending from the bracket in diverging relationship to the first and second leaves to a point proximate the lower extremity of the axle, said third leaf wrapping around the axle so as to extend from a point proximate to the lower extremity of the axle to a point proximate the rearward extremity of the axle; forward clamp means fixedly securing the first and second leaves to the axle forwardly thereof; rearward clamp means fixedly securing the first, second and third leaves to the axle rearwardly thereof; and, resilient means disposed to suspend the frame on the axle.

3. A suspension assembly for positioning a wheel supported axle below the frame of a vehicle, said assembly comprising: a pair of transversely spaced hangers depending from the frame; a bracket pivotally mounted on each of the hangers, each of said brackets having an upstanding flange forward of the hanger on which it is mounted and a saddle adapted to carry a U-bolt disposed rearwardly of the hanger; a leaf spring bundle secured to each bracket and extending therefrom to the axle, each of said bundles comprising upper and lower leaves which diverge relative to one another from the hanger to which it is connected and having a lowermost leaf fastened to the upstanding flange on the bracket to which the bundle is secured and an uppermost leaf fastened to the bracket rearwardly of the hanger by a U-bolt assembly disposed in the saddle portion of the bracket; means securing the upper and lower leaves of each bundle to the axle in vertically spaced relationship; and, resilient means disposed to suspend the frame on the axle.

4. A suspension assembly for positioning a wheel supported axle below the frame of a vehicle, said assembly comprising: a pair of transversely spaced hangers depending from the frame; a bracket pivotally mounted on each of the hangers; a leaf spring bundle secured to each bracket and extending therefrom to the axle, each of said bundles comprising upper and lower leaves which diverge relative to one another from the hanger to which it is connected; means securing the upper and lower leaves of each bundle to the axle in vertically spaced relationship, said means comprising radially outstanding flanges secured to the axle and U-bolt assemblies securing the leaf spring bundles to the outstanding flanges; and, resilient means disposed to suspend the frame on the axle.

5. A trailing arm for positioning the axle of a vehicle, said arm comprising:
 a. a bracket adapted to be pivotally secured to a suspension hanger, said bracket comprising an upstanding flange positioned to be forwardly of a hanger to which the bracket is secured and a saddle positioned to be rearwardly of a hanger to which the bracket is secured;
 b. first and second leaf spring elements disposed in juxtaposition and having rearward ends adapted to be secured to an axle to be positioned;
 c. a third leaf spring element disposed beneath the first and second leaf spring elements so as to diverge from the forward ends thereof to a rearward end adapted to be secured to the axle to be positioned;
 d. means securing at least one of the first and second leaf spring elements and the third leaf spring element to the upstanding flange of the bracket for selective longitudinal adjustment of said elements relative to the bracket; and,
 e. a U-bolt assembly disposed in the saddle of the bracket and for engagement with the first and second spring elements so as to fasten said elements to the bracket.

6. A suspension assembly for positioning a wheel supported axle for suport of the frame of a vehicle, said assembly comprising: a pair of transversely spaced hangers depending from the frame; a bracket pivotally mounted on each of said hangers; a leaf spring bundle secured to each bracket and extending therefrom to the axle, each of said bundles comprising upper and lower leaves fixedly secured to the bracket from which the bundle extends and extending therefrom to fixed connections with the axle spaced relative to one another so that a torque force from the axle is transmitted to the bracket through one of the leaves in compression and the other in tension.

* * * * *